United States Patent
Winnington et al.

[11] Patent Number: 6,035,650
[45] Date of Patent: Mar. 14, 2000

[54] HEAT PUMPS

[75] Inventors: Terence Leslie Winnington; Richard John Green; Robert Lorton, all of Gloucestershire, United Kingdom; Robert Brownlee Uselton, Plano, Tex.

[73] Assignee: Interotex Limited, Berkshire, United Kingdom

[21] Appl. No.: 09/051,604

[22] PCT Filed: Oct. 11, 1996

[86] PCT No.: PCT/GB96/02486

§ 371 Date: Apr. 14, 1998

§ 102(e) Date: Apr. 14, 1998

[87] PCT Pub. No.: WO97/14924

PCT Pub. Date: Apr. 24, 1997

[30] Foreign Application Priority Data

Oct. 14, 1995 [GB] United Kingdom .................. 9521083

[51] Int. Cl.[7] .................................................. F25B 15/00
[52] U.S. Cl. .................................. 62/105; 62/141; 62/476
[58] Field of Search ............................ 62/101, 103, 105, 62/141, 476, 483, 489

[56] References Cited

U.S. PATENT DOCUMENTS

| | | |
|---|---|---|
| 2,277,429 | 3/1942 | Fiene . |
| 3,054,272 | 9/1962 | Leonard ................................. 62/141 |
| 3,154,930 | 11/1964 | Aronson . |
| 3,287,928 | 11/1966 | Reid ...................................... 62/141 |
| 3,300,999 | 1/1967 | Reid ...................................... 62/141 |
| 3,374,644 | 3/1968 | Foster .................................... 62/141 |
| 3,410,104 | 11/1968 | Hopkins ................................. 62/148 |
| 3,517,522 | 6/1970 | Ozono et al. .......................... 62/141 |
| 3,604,216 | 9/1971 | Porter .................................... 62/141 |
| 3,626,710 | 12/1971 | Porter .................................... 62/141 |
| 3,626,711 | 12/1971 | Porter et al. ........................... 62/141 |
| 3,695,053 | 10/1972 | Griffin ................................... 62/103 |
| 4,090,372 | 5/1978 | Lamb . |
| 4,485,638 | 12/1984 | Reimann ............................... 62/476 |
| 4,894,998 | 1/1990 | Kaneko et al. . |

FOREIGN PATENT DOCUMENTS

| | | |
|---|---|---|
| 1 476 959 | 10/1969 | Germany . |
| 2-40459 | 2/1990 | Japan . |

*Primary Examiner*—William Doerrler
*Attorney, Agent, or Firm*—Young & Thompson

[57] ABSTRACT

A rotary heat pump 10 comprises a vapor generator 20, a condenser 24/34, an evaporator 42 and an absorber 40 interconnected to provide cyclic fluid flow paths for a volatile fluid component and an absorbent fluid therefor. To allow operation of the pump close to the crystallization boundary the pump includes crystallization control means which cause the temperature of the fluid in the region prone to crystallization to be raised when the onset of crystallization is detected. For example the pressure increase upstream of a crystallization site may cause warm fluid to be diverted directly or indirectly to increase the fluid temperature at the crystallization site. The Specification also describes features for controlling the absorbent mixture flow rate; for controlling the concentration thereof; for damping a scoop pump; for assuming flow onto the generator face; for pressure relief and extended operation of the pump; to novel heat exchangers; to metal compositions for the heat pump, and to hydrogen getters for use in heat pumps.

12 Claims, 5 Drawing Sheets

HEAT PUMPS

This invention relates to heat pumps of the absorption cycle type, particularly to such heat pumps of a rotary or centrifugal design, and to methods of operating said heat pumps.

Absorption cycle heat pumps comprise the following components: evaporator, absorber, generator, condenser and optionally a solution heat-exchanger; and are charged with a suitable working mixture in the fluid phase. The working mixture comprises a volatile component and an absorbent therefor.

In absorption cycle heat pumps, a high temperature source of heat, so-called high-grade heat, and a low temperature source of heat, so-called low-grade heat, deliver heat to the heat pump, which then delivers (or ejects) the sum of the heat input from both sources at an intermediate temperature.

In operation of conventional heat absorption cycle heat pumps, a working mixture which is rich in a volatile component (which mixture is hereinafter referred to for convenience as "Mixture R") is heated in the generator, under pressure, by high-grade heat such that vapour of the volatile component is generated and a working mixture which is less rich or lean in the volatile component is produced (which mixture is hereinafter referred to for convenience as "Mixture L").

In known single stage heat pumps the aforesaid vapour of the volatile component from the generator is condensed in the condenser, at the same high pressure, with the evolution of heat and the formation of liquid volatile component. The liquid volatile component is passed through an expansion valve, to reduce the pressure thereof, and thence to an evaporator. In the evaporator, the aforesaid liquid accepts heat from a low temperature source of heat, typically air or water at ambient temperature, and evaporates. The resulting vapour of the volatile component passes to an absorber where it is absorbed in Mixture L with the re-formation of Mixture R and evolution of heat. The Mixture R is then transferred to the vapour generator and hence completes the cycle. Many variations on this process are possible; for example the heat pump may have two or more stages, where vapour from the volatile component evaporated by the first mentioned (primary) vapour generator condenses in an intermediate condenser which is thermally coupled to supply heat to an intermediate vapour generator which creates further volatile component vapour to condense in the first mentioned (primary) condenser.

Where we wish to emphasize the physical state of the volatile component we shall, for convenience, refer to it as 'VVC' (when it is in the gas or vapour state) or 'LVC' (when it is in the liquid state). The volatile component may otherwise be referred to as the refrigerant, and the mixtures L and R as absorbent fluid. In the particular example given, the refrigerant is water and the absorbent fluid is a hydroxide solution comprising alkali metal hydroxides as described in EP-A-208427, the contents of which are incorporated herein by reference.

U.S. Pat. No. 5,009,085 discloses an earlier rotary heat pump, and the teachings of that document are incorporated herein by reference. There are various problems associated with a heat pump of the kind described in U.S. Pat. No. 5,009,085, and various aspects of the present invention seek to overcome or at least mitigate these problems.

In heat pumps such as those described in U.S. Pat. No. 5,009,085, there is a risk of catastrophic failure if the working fluid should crystallize or otherwise experience restricted flow. For this reason the heat pump is usually operated with the maximum solution concentration set well away from the crystallization condition, and determined by the desire to avoid crystallization rather than to provide maximum efficiency. We have developed a modification which initiates corrective action when the onset of crystallization is detected, thus allowing safe operation close to the crystallization condition.

Accordingly in one aspect, this invention provides an absorption cycle heat pump including means responsive to the onset of crystallisation of absorbent in the working fluid, or the onset of unacceptably high viscosity, to initiate means for preventing further crystallisation and/or for re-dissolving crystallised material, or reducing said viscosity.

The area most prone to crystallization or flow restriction is normally sited in the absorbent fluid flow path into the absorber from the solution heat exchanger, which is at its lowest temperature and highest concentration.

The means for preventing may comprise clearance means for increasing the temperature and/or reducing the concentration of absorbent in the working fluid at or adjacent said crystallisation site. For example a stream of fluid may be diverted at least temporarily to increase the temperature of the flow past said crystallisation site either directly or indirectly by thermal exchange. This may be activated by detecting the local pressure upstream of the crystallization site.

In one method, where absorbent fluid passing from the vapour generator to the absorber gives up heat to absorbent fluid passing in the opposite direction via a solution heat exchanger, a portion of the absorbent fluid from the path from the generator to the absorber, which will have a relatively high temperature, is diverted to be introduced into the return flow from the absorber back to the generator. In this way, the temperature of the return flow is increased which raises the temperature of the flow upstream of the crystallization site, thereby dissolving or reducing the viscosity of the liquid at said site.

This diversion may be achieved by providing a pressure dependent control such as a valve or a weir between the two flows, whereby said introduction is initiated when the back pressure caused by the onset of crystallization or unacceptably high viscosity exceeds a preset threshold.

Alternatively, coolant fluid may be diverted from the condenser to the evaporator, thereby to raise the evaporation temperature and cause an increased amount of refrigerant to evaporate and be taken up by the absorbent, resulting in a temporary decrease in concentration of absorbent in the working fluid and an increase in temperature of the working fluid in the crystallisation region.

A further problem is that of maintaining a reasonably high efficiency whilst running the heat pump at less than full capacity, when the temperature lift and/or thermal load is reduced. The temperature lift is defined as the temperature difference between the evaporator and the absorber. We have found that it is possible to improve cycle efficiencies in these part-load conditions by controlling the flow rate of absorbent fluid around the cycle in accordance with the thermal load and/or temperature lift. Furthermore, we have found that it is possible to design the heat pump so that the dynamic or static pressures in the pump tend to adjust the flow rate of absorbent fluid to suit the prevailing temperature lift or thermal load, thus obviating the need for adjustable control valves or the like, although we do not exclude the possibility of such control arrangements.

Accordingly, in another aspect, this invention provides an absorption cycle heat pump comprising a vapour generator, a condenser, an evaporator and an absorber so interconnected as to provide cyclic fluid flow paths for a volatile fluid component and an absorbent fluid therefor, and flow rate control means for controlling the flow rate of the said absorbent fluid in accordance with at least one of:

(i) the temperature difference between the absorber and the evaporator, and (ii) the thermal load on the heat pump, and (iii) one or more other operating parameters.

The flow rate may be adjusted in various ways but it is preferred not to do so by varying the pump capacity. Thus the flow rate control means may conveniently comprise flow restriction means in the absorbent fluid flow path from said generator. The restriction may be controlled to give the required performance by the use of an active control system, but we have found that suitable control may be achieved by a passive restrictor such as an orifice, a vortex, a capillary or a combination of some or all of these.

Preferably the heat pump is designed so that the flow rate of the absorbent fluid from the generator depends on the operating pressure difference at either end of the absorbent fluid path from the generator, and/or the manometric pressure difference due to any difference between the free surface levels in the absorbent fluid at either end of the fluid path from the generator.

Thus, the heat pump and the flow characteristics of the restriction means may be designed to give a particular flow rate which varies with the operating pressures to provide the variation in flow rate to suit the varying operating conditions as described below in connection with FIG. 6. Likewise, the fluid path from the generator may be selected to have reservoir means at either end, wherein the reservoir means are dimensioned and disposed to provide free surface levels at selected heights or radial distances to give the required manometric pressure difference in operation.

In one specific example, the generator contains a reservoir in the form of a feed chamber in which absorbent liquid collects before exiting the generator, and which defines a free surface, and the fluid path from the generator terminates in a trough adjacent the absorber, and the feed chamber is disposed so that, in normal operation, the free fluid level therein is higher or radially inwardly relative to that in the trough.

Alternatively, the downstream end of the absorbent fluid path from the generator may terminate in an outlet which is normally above the surface of liquid in a reservoir means associated therewith which collects fluid discharged therefrom, whereby the outlet head defines the manometric exit pressure.

As discussed above, there may be active control of the flow rate of the absorbent liquid. Thus said flow rate control means may comprise one or more detector means for determining or predicting one or more operating parameters of the apparatus and means responsive to said detector means for controlling the flow rate of said absorbent fluid in accordance therewith.

Another area of difficulty in a rotary heat pump involves the various pump arrangements, each of which typically comprises a scoop pump which is rotationally constrained as the heat pump rotates, and which scoops liquid from an annular trough or reservoir and delivers it as required elsewhere. In a typical scoop pump design, at start up the heat pump is initially stationary and the fluid will have collected in the lowermost arc of the trough with the radial depth far greater than when the heat pump is rotating. The scoop pump includes a bob mass which means that it too resides in the lowermost part of the trough, submersed in the fluid. Consequently on start up there is a large drag force between the fluid in the trough and the scoop pump which creates inefficiencies and delays the onset of steady state operation. We have developed a new form of scoop pump which allows the start-up drag associated with conventional designs to be considerably reduced. The design also has benefits in reducing the fixed mass associated with conventional scoop pumps and thus reducing the shock loads likely to be experienced by the scoop pump in transport.

Accordingly, in another aspect, this invention provides an absorption cycle heat pump comprising a rotary assembly including a vapour generator, a condenser, an evaporator and an absorber so interconnected as to provide cyclic fluid flow paths for a volatile component and an absorbent fluid therefor, wherein at least one of said generator, evaporator and said absorber includes a scoop pump comprising a bob member rotatably mounted within said assembly, constrained against rotation with said assembly and arranged in use to collect fluid from a generally circumferentially disposed trough or reservoir, said bob member including a bob container eccentric with respect to the rotational axis of said assembly for being charged with fluid from said trough or reservoir when the pump is at rest.

This arrangement has several important advantages. Because part of the fluid will be contained in the bob container, there will be less fluid in the trough and so the drag forces on start up are considerably reduced. Also the fluid in the bob container increases the stationary mass of the scoop pump which means that it will have greater inertia and therefore be effected less by drag forces.

Said bob container may receive fluid from the trough via an orifice without a pumping action but it is preferred for said scoop pump to include means for delivering at least part of the fluid collected thereby to said bob container.

Thus, when said pump is operating steadily, the mass of the fluid in said bob container may provide a significant or major part of the mass of said bob member. The bob container may include bleed drain means for allowing a portion of the fluid in said bob container to drain back into said trough or container. Thus, in a typical embodiment, when said heat pump is stationary with its rotary axis horizontal, said container is at least partially immersed in fluid contained in said trough or reservoir, and is at least partially filled with fluid.

It will be understood that the scoop pump arrangement may be used in place of any of the scoop pumps used in conventional rotary heat pumps. The pumps according to this aspect of this invention also provide an important facility of providing a container for a starting buffer for any liquid-containing trough, and in particular for containing variable amounts of fluid to allow control of the absorbent fluid concentration, as to be discussed below.

We have also developed an arrangement which adjusts the relative proportions of absorbent and volatile components in the mixture to match the operating conditions. Again, this could be achieved by temperature sensing and the use of one or more control valves, but we have found that it is possible to provide absorbent concentration control by suitable design of the pump such that a variable amount of refrigerant is caused to be stored in a reservoir dependent on the operating conditions, thereby to provide useful control of the solution concentration. We have also developed this arrangement further to allow the maximum solution concentration to be limited.

Accordingly, in another aspect, this invention provides an absorption cycle heat pump having a working fluid comprising an absorbent and a volatile component, including means for adjusting the concentration of said absorbent in said working fluid in accordance with at least one of:
(i) the temperature difference between the absorber and the evaporator,
(ii) said working fluid in accordance with the thermal load on said heat pump, and
(iii) one or more other operating parameters.

Preferably, the concentration is adjusted by varying the amount of volatile component stored in a running buffer.

Thus, said means for adjusting the concentration may include one or more reservoir means for storing variable amounts of volatile component and/or absorbent fluid, and means for pumping fluid to and from said reservoir means to adjust said concentration.

In operation, the amount of volatile component evaporated by the evaporator at a particular temperature lift is a function of the absorbent fluid concentration. As the rate of evaporation decreases, more fluid collects in the evaporator and, in this aspect of the invention, the excess fluid is stored in a buffer, thus reducing the proportion of volatile component in the mixture supplied to the absorber, and thus causing the rate of evaporation to increase.

In a particular embodiment, running buffers of mixture and volatile component are stored in respective reservoirs, typically in the generator and the evaporator, although other locations are of course possible. The running reservoirs may conveniently comprise bob containers as referred to above, which contribute to the inertia of the scoop pumps.

It is preferred to limit the concentration of working fluid in the heat pump. For example the volatile component buffer may include overflow means, which limit the maximum leanness of the mixture circulating elsewhere by limiting the amount of refrigerant that may be stored in the bob container in the evaporator. Thus the overflow means may pass liquid volatile component from said running reservoir into the stream of absorbent fluid supplied to the absorber, when the concentration exceeds or approaches a preset limit. This may be determined by reference to the amount of refrigerant in said running reservoir and/or collecting adjacent said evaporator.

A further source of inefficiency associated with rotary heat pumps which we have discovered is the tendency for the scoop pump assemblies to oscillate about the rotary axis if the level of liquid in the associated trough falls below the inlet pipe of the scoop pump, and this oscillation can significantly affect the efficiency of the pump. Accordingly, we have developed various arrangements whereby the oscillation may be damped.

Accordingly, in another aspect, this invention provides an absorption cycle heat pump including a rotary assembly comprising a vapour generator, a condenser, an evaporator and an absorber, said heat pump including scoop pump means rotatably mounted within said assembly but constrained against rotation therewith, said scoop pump having an inlet aperture for collecting fluid from a circumferential trough or reservoir which rotates relative to said scoop pump, said heat pump including stabilising means stabilising said scoop pump means particularly but not exclusively when the liquid level in said trough or reservoir is below said inlet aperture.

The stabilising means may take many forms. In one example, said means may comprise means defining a track constraining a movable mass which is adapted to be moved on swinging movement of said scoop pump. In this way oscillatory movement may readily be damped by energy dissipation caused by the stiction/friction forces between the mass and said track. The track is preferably curved, with convex surface thereof being vertically above or below the stabilising centre of gravity and the shaft.

Alternatively said stabilising means may comprise drag-inducing means, such as for example a fin or other drag surface or a further pump inlet means for a further scoop pump.

A further difficulty that may be encountered particularly at start up of a rotary heat pump is that the fluid inventories around the system may be such that there is insufficient flow of mixture onto the generator. This may lead to severe overheating and damage to the generator wall. We have therefore developed a new arrangement which ensures that the generator ON pump has priority access to the working mixture.

Accordingly, in a yet further aspect, this invention provides an absorption cycle heat pump comprising a rotary assembly including a vapour generator, a condenser, an evaporator and an absorber so interconnected as to provide cyclic fluid flow paths for a volatile liquid component and an absorbent liquid therefor, generator ON pump means for pumping absorbent fluid onto a heated surface of said generator, generator OFF pump means for collecting and pumping away fluid draining off said generator surface, and means for ensuring that said generator ON pump means has an adequate supply of fluid to wet said generator face on initial operation of the heat pump.

The means for ensuring preferably comprises common reservoir means which in use receives absorbent liquid draining off said generator surface and absorbent liquid for being sprayed onto said generator surface, and said generator ON pump and said generator OFF pump preferably each take absorbent liquid from said common reservoir means, with said generator ON pump having preferential access thereto. In one arrangement, said generator ON and OFF pumps are scoop pumps, said reservoir means is a generally circumferential trough, and the inlet of the generator ON scoop is radially further from the rotational axis than the inlet of the generator OFF pump. The generator ON pump and OFF pump may comprise a single pump with flow split downstream thereof.

In another aspect the invention provides an absorption cycle heat pump comprising a rotary assembly including a vapour generator, a condenser, an evaporator and an absorber so interconnected as to provide cyclic fluid flow paths for a volatile liquid component and an absorbent liquid therefor, and including a common reservoir means for collecting absorbent liquid draining off the heated surface of said generator, and for receiving fluid to be supplied to the heated surface of the generator.

A further difficulty encountered in rotary heat pumps of the type disclosed in U.S. Pat. No. 5,009,085 is to provide effective mass and heat transfer to the coolant fluid in the condenser and the absorber. In this earlier document, the absorber and condenser comprised an absorber disc and condenser disc to either side of a partition, and the surfaces over which the mixture and water flowed respectively were defined by flat plates, consistent with the understanding of centrifugal process intensification at the time, and as expounded previously in EP-B-119776. We have found however, that the heat exchangers may advantageously be made of coiled tube and surprisingly this provides effective enhanced heat and mass transfer in a rotary pump.

Accordingly, in another aspect, there is provided an absorption cycle rotary or centrifugal heat pump comprising an assembly including a vapour generator, a condenser, an evaporator and an absorber, wherein one or more of the condenser, evaporator and the absorber comprise a heat exchanger defined by a spiral of tubing, or having a corrugated outer surface.

The spiral may be generally closed with intermediate turns of the spiral in contact with or close to both the next inner and the next outer turn, to define a heat exchanger with two opposite interrupted or corrugated faces. The tubing is preferably of generally flattened circular cross-section, with the flattened portions close to each other or areas in mutual contact. The spiral may be flat or dished.

In conventional heat pumps, the internal atmosphere is empty of air and corrosion tends to result in generation of free hydrogen gas which impairs the absorption of volatile component by the absorbent fluid, thus degrading the efficiency of the pump. This can be dealt with by pumping out the heat pump at regular intervals but this is time-consuming and potentially hazardous, and thus not recommended for commercial use. An alternative possibility is the use of palladium fingers, but these are expensive and also require heaters and associated equipment. We have however found that by careful selection of materials it is possible to reduce considerably the amount of hydrogen generated in normal use, and to provide a relatively inexpensive and simple arrangement for capturing free hydrogen so that it does not degrade the performance of the heat pump.

Accordingly, in another aspect of this invention, there is provided an absorption cycle heat pump including a substrate of material adapted to absorb and/or bind hydrogen molecules in use.

The substrate material preferably comprises a hydrogenatable material incorporating a suitable catalyst. Examples of suitable hydrogenatable materials are based on the homogeneously-catalyzed hydrogenation of reducible organic polymers. A typical combination comprises a polystyrene-polybutadiene-polystyrene (PS-PB-PS) triblock copolymer in conjunction with an Iridium-based catalyst such as the Crabtree Catalyst set out below, or a Rhenium Catalyst. Many other suitable materials of similar characteristics will be known to those skilled in the art. Preferably the substrate includes indicator means which indicate when the material approaching the state where it is saturated with or otherwise unable to bind or absorb any more hydrogen.

We have also developed a safety system for discharging excess pressures in a heat pump, but which also has the unexpected benefit of allowing continued and/or extended operation of the heat pump.

Accordingly, in this aspect of this invention, there is provided an absorption cycle heat pump comprising a high pressure generator/intermediate condenser chamber, an intermediate pressure intermediate generator/condenser chamber, and a low pressure evaporator absorber chamber, and including pressure relief means intermediate:

(i) said high pressure chamber and said intermediate pressure chamber and/or (ii) said intermediate pressure chamber and said low pressure chamber.

The pressure relief means preferably provides controlled relief whereby flow through said relief means is dependent on the pressure difference. In one example, when the pressure difference reaches a pre-set level, the relief means opens and the flow rate increases with increases in pressure difference. In this way the operating range of the device is extended and it may operate as a single stage heat pump and return to two stage operation when the pressure differences have returned below the pre-set level.

The hydroxide-based absorbent materials including those disclosed in EP-A-208427 are known to be highly corrosive particularly at the high temperatures at which the burner operates and great care must be taken when selecting the materials from which the hermetic enclosure defining the rotary assembly and the internal components are made. In the past the walls and components have been made of copper-nickel alloys such as "monel" containing substantial proportions of nickel and other metals. We have however found, somewhat surprisingly, that despite initial indications to the contrary, it is in fact possible to employ copper and copper alloys where the alloy metals comprises less than about 15% by weight of the material.

Accordingly, in a further aspect of this invention, there is provided an absorption cycle heat pump comprising a generally sealed enclosure containing a working fluid comprising one or more alkali metal hydroxides, wherein at least part of said enclosure which is in contact with said working fluid is made of a copper material containing up to about 15% by weight of alloying or additive materials such as chrome, aluminium, iron etc.

Preferably substantially the whole of the enclosure is made of said copper material.

Said copper material preferably comprises a copper-nickel alloy. We have found that copper nickel alloys of low nickel content which normally would be expected to corrode badly in contact with the hydroxide fluid, are in fact highly resistant, even at the high temperatures experienced at the vapour generator.

Whilst the invention has been described above, it extends to any inventive combination of features set out above or in the following description and drawings. In particular the features defined may, where the context allows, be used in rotary or non-rotary heat pumps, and single or multistage heat pumps either alone or in combination with each other. The invention also extends to methods of operating absorption cycle heat pumps in accordance with the principles set out above and in the following description. Thus in a further aspect this invention provides a method of operating an absorption cycle heat pump, which comprises monitoring the working fluid to detect or predict the onset of crystallisation of absorbent in the working fluid or the onset of unacceptably high viscosity thereof, and, on detecting or predicting either condition, initiating preventive measures for preventing further crystallisation and/or re-dissolving crystallised material, or reducing said viscosity.

Preferably, said initiating step comprises diverting a stream of fluid (e.g. warm working fluid) at least temporarily to increase the temperature adjacent a site prone to crystallisation or increased viscosity. Said monitoring step may comprise monitoring or responding to the pressure upstream of a site prone to crystallisation or increased viscosity. Where the working fluid comprises a crystallisable absorbent liquid, said initiating step may comprise at least temporarily reducing the concentration of absorbent liquid adjacent or upstream of a site prone to crystallisation.

In a further aspect, this invention provides a method of operating an absorption cycle heat pump comprising a vapour generator, a condenser, an evaporator and an absorber so interconnected as to provide cyclic fluid flow paths for a volatile fluid component and an absorbent fluid therefor, which comprises controlling the flow rate in accordance with at least one of:

(i) the temperature difference between the absorber and the evaporator, (ii) the thermal load on the heat pump, and (iii) one or more other operating parameters.

By way of example only, an embodiment, of heat pump in accordance with this invention will now be described in detail, with various modifications thereof, reference being made to the accompanying drawings, in which.

Figure 5:
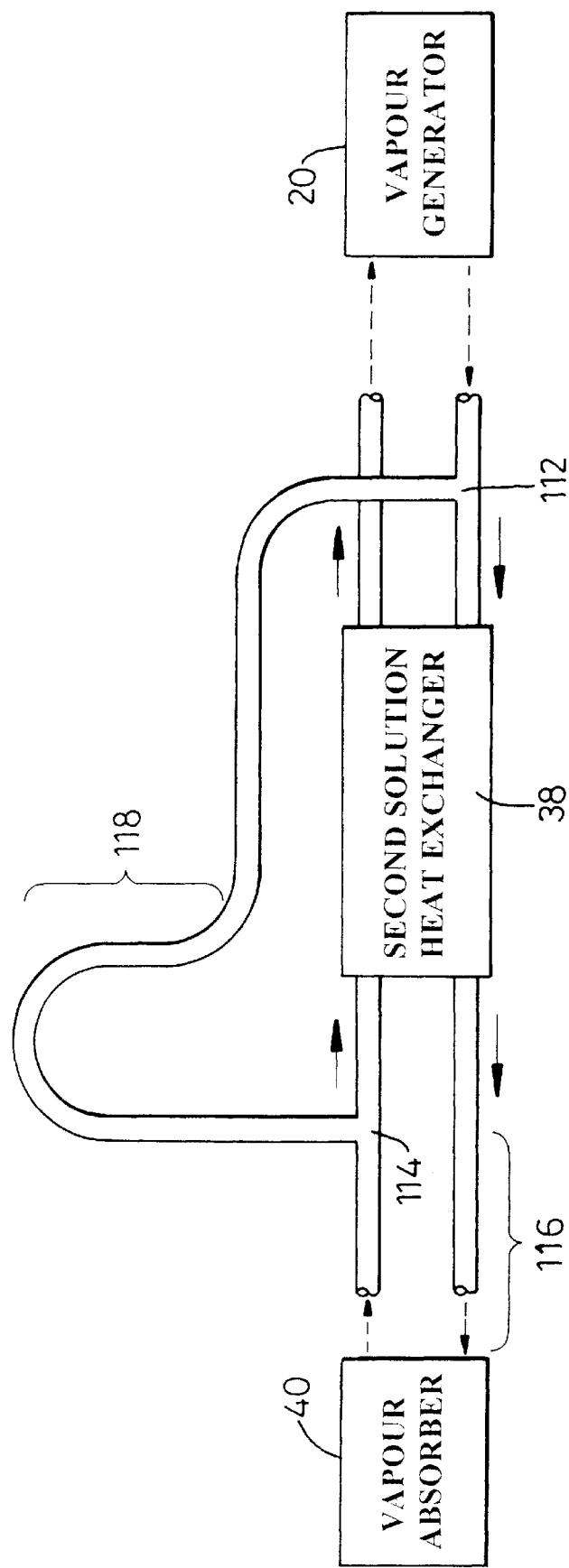
Figure 6:
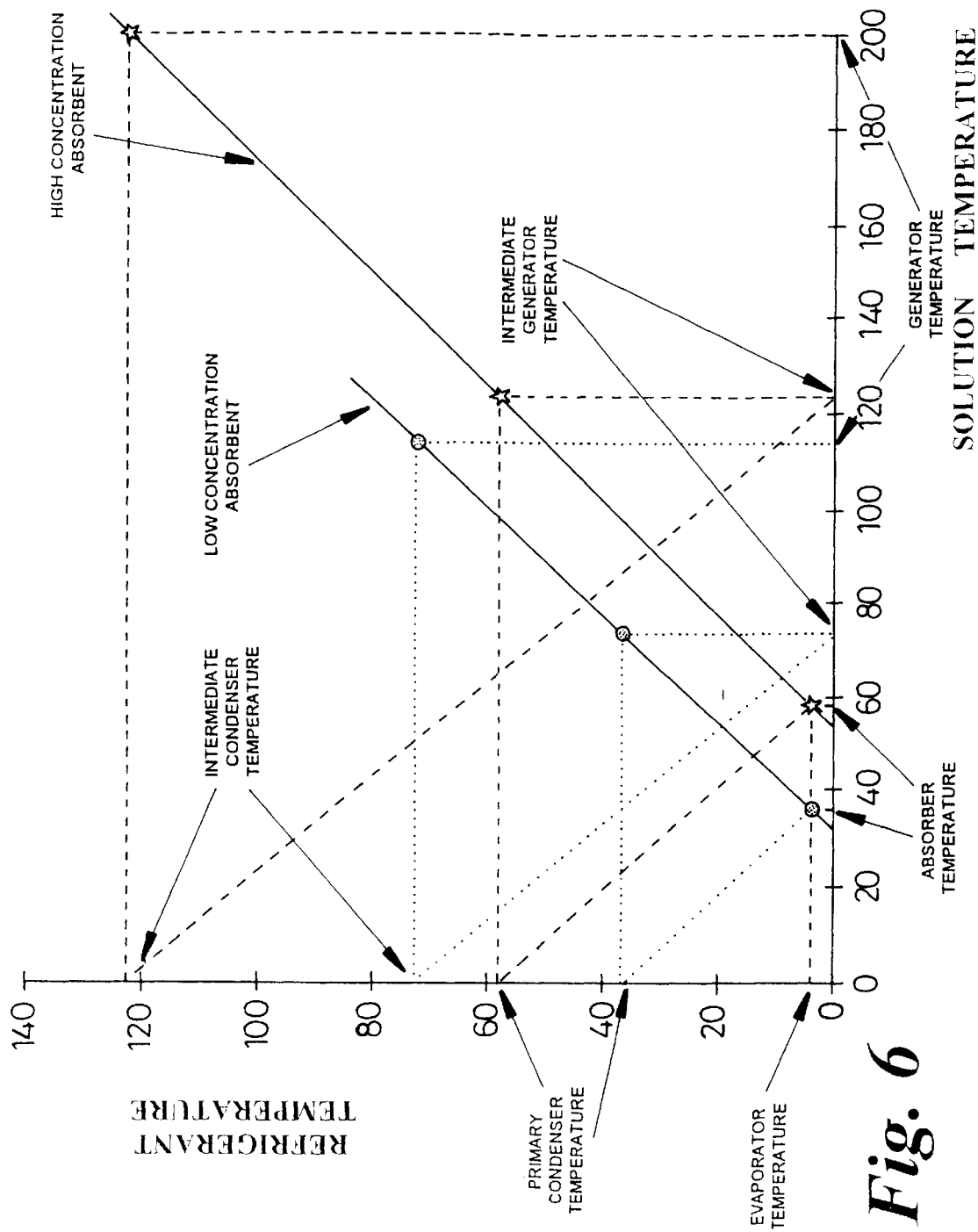

FIG. 5 is a schematic diagram illustrating a possible pressure sensitive flow control for use in reducing the possibility of crystallization in the absorbent fluid flow between the generator and the absorber, and FIG. 6 is an idealised diagram representing the optimal solution concentrations and the temperatures of the other elements of the heat pump for a set evaporator temperature and two different temperature lifts.

Figure 1:
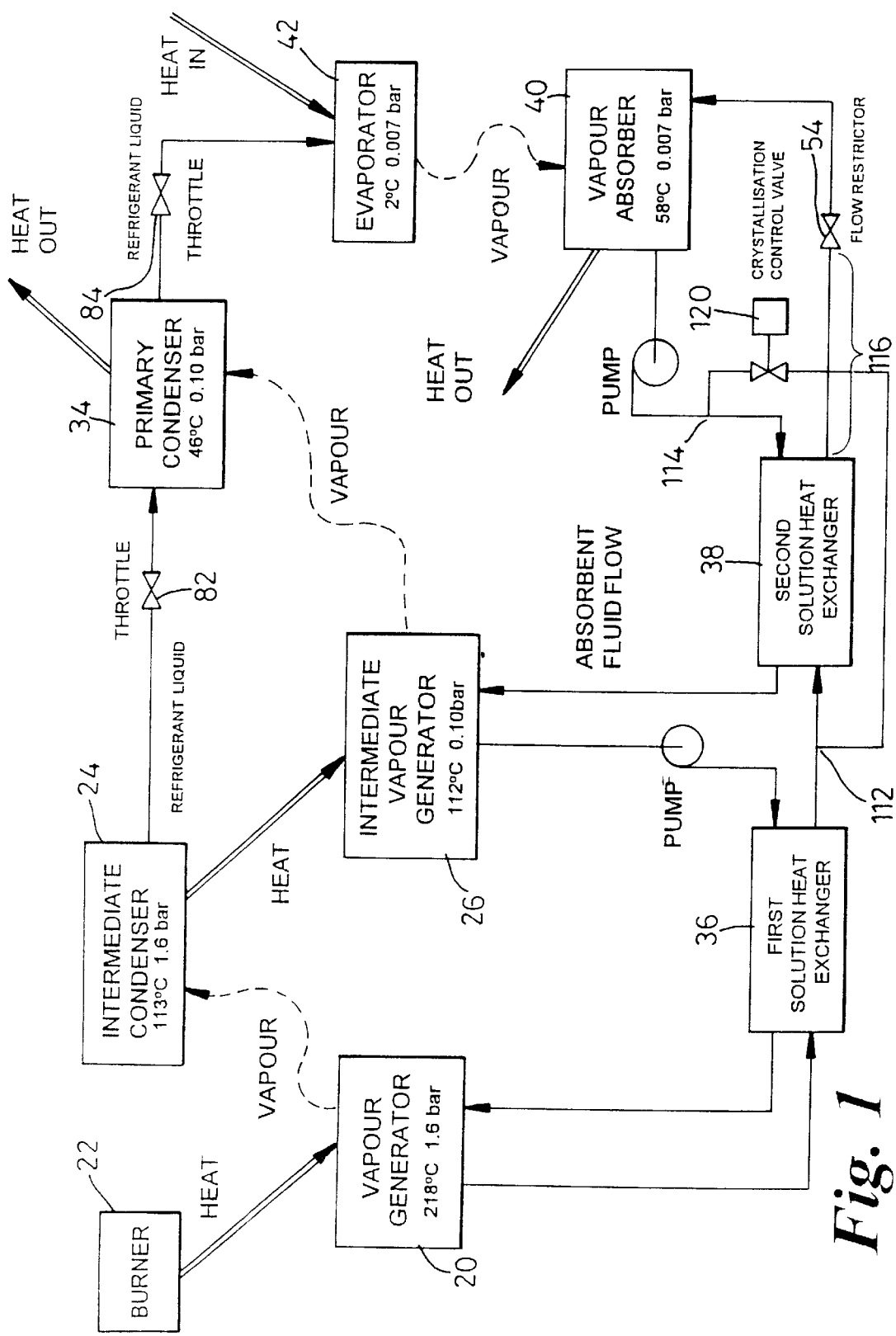
FIG. 1 is a system diagram of a two stage heat pump in accordance with this invention, with non-limiting temperatures and pressures given merely by way of illustration.
Figure 2:
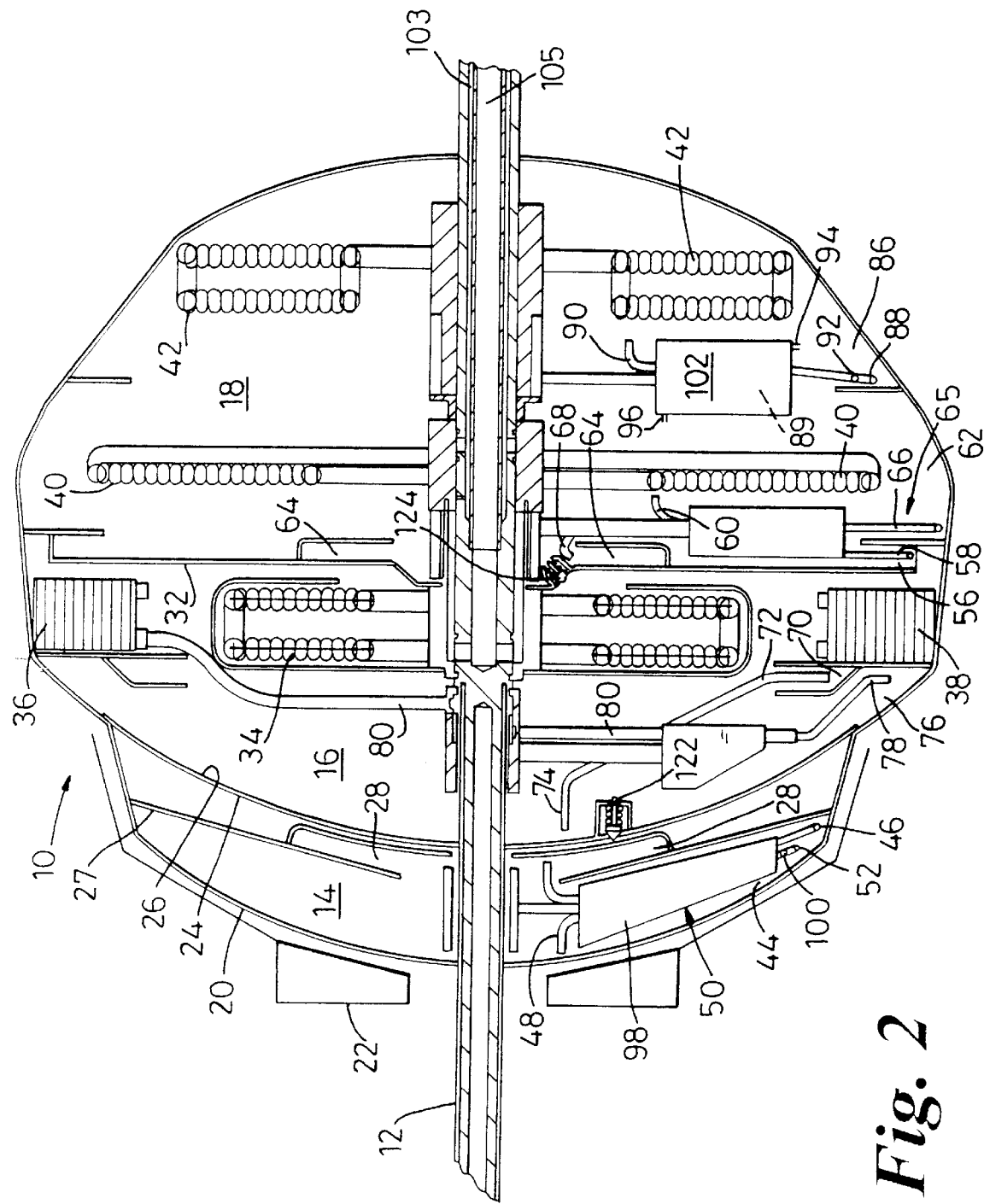
FIG. 2 is a schematic side view of a heat pump in accordance with this invention, showing the principle components of the heat pump, but with several interconnections, components and the working fluid omitted for clarity.

Referring to FIGS. 1 and 2, the illustrated embodiment of heat pump comprises a hermetically sealed unit 10 which rotates with a shaft 12 and which defines a high pressure space 14, an intermediate pressure space 16, and a low pressure space 18. The terms "high", "intermediate" and "low" refer to the pressures therein when the heat pump is operating. The interior of the heat pump is emptied of air during manufacture. The high pressure space 14 is bounded at the left hand side as viewed by a wall acting as a vapour generator 20, which is heated externally by a burner 22. At its other side, the high pressure space 14 is bounded by a wall which defines a condenser 24 on its high pressure surface, and an intermediate vapour generator 26 on the other surface, and which also defines the left hand end of the intermediate pressure space 16. A further wall 27 is located within the high pressure space 14, disposed between the vapour generator 20 and the condenser 24 and defining a feed chamber 28, for collecting fluid from the generator OFF pipe 30, as to be described below.

The intermediate pressure space 16 is separated from the low pressure space by a partition wall 32, and contains a condenser twin coil 34, and first and second solution heat exchangers 36 and 38. The low pressure space 18 contains an absorber coil 40 and an evaporator twin coil 42.

In operation a water-rich mixture of water and alkali-metal hydroxides is scooped from a common generator ON/OFF trough 44 by a generator ON scoop pump inlet 46 and discharged from the generator ON delivery pipe 48 onto the vapour generator 20 to spread over the surface. A proportion of the volatile component (water) evaporates and passes to the condenser 24. The remaining, water-lean mixture 'L' collects in the generator ON/OFF trough 44. The generator ON scoop pump inlet 46 forms part of a fluid weighted scoop pump assembly 50 which will be described in more detail below. A generator OFF scoop pump inlet 52 is part of the same assembly but is disposed radially inwardly of the generator ON scoop pump inlet 46. The generator OFF scoop pump discharges the mixture 'L' into the annular feed chamber 28, whence the mixture passes via a pipe (not shown) into the cooling pass of the first solution heat exchanger 36 where it gives up heat to mixture 'R' flowing in the other side and about to return to the generator ON/OFF trough 44 from the intermediate vapour generator 26 (see FIG. 1). Having passed through the cooling pass of the first solution heat exchanger 36, the mixture 'L' then passes through the cooling pass of the second solution heat exchanger 38, where it gives up heat to fluid on the other side which is flowing from the vapour absorber 40 to the intermediate vapour generator 26. From the cooling pass, the mixture 'L' passes through a flow restrictor 54 (see FIG. 1), and thence into an annular absorber ON trough 56 formed on the absorber side of the partition wall 32. From here, the mixture is collected by the scoop pump inlet 58 of an absorber ON scoop pump and discharged via delivery pipe 60 onto the coil of the absorber 40, where it absorbs volatile component from the evaporator 42.

The mixture which is now water-rich collects in an absorber OFF trough 62, whence it is pumped to a feed chamber 64 formed as an annular trough on the partition wall 32, radially inwardly of the absorber ON trough 56, via an absorber OFF scoop pump inlet 66 and delivery pipe 68. The absorber ON and OFF scoop pumps are part of a common assembly 65.

From the feed chamber 64, the water-rich mixture passes to the heating pass of the second solution heat exchanger 38 where it is heated, and then delivered to an intermediate generator ON trough 70. From there the fluid is collected by the inlet 72 of an intermediate generator ON scoop pump and discharged by the delivery pipe 74 towards the centre of the intermediate generator 26 where it receives heat from the intermediate condenser 24 on the other surface of the same wall. A portion of the volatile component is evaporated by the intermediate vapour generator 26 and passes to the coil condenser 34 of the primary condenser. The liquid mixture leaving the intermediate vapour generator 26 collects in an OFF trough 76 whence it is scooped by the inlet 78 of an intermediate generator OFF pump and supplied via a delivery pipe 80 to the heating pass of the first solution heat exchanger 36, where it is heated and then returns to the common generator ON/OFF trough 44. The intermediate generator ON and OFF scoop pumps form part of a common assembly mounted on the shaft 12. For clarity the flow connections to and from the solution heat exchangers have been omitted.

Looking now at the flow cycle for the volatile component, a proportion of the volatile component is evaporated in the high pressure space 14, as the mixture passes over the vapour generator 20, and the VVC condenses on the surface of the intermediate condenser 24. The condensed LVC is then passed to the primary condenser 34 in the intermediate pressure space 16 via a throttle 82 (see FIG. 1).

From the primary condenser 34, the LVC passes via a further throttle 84 to an evaporator ON trough 86 in the low pressure space 18. Here the fluid is collected by the scoop pump inlet 88 of an evaporator ON pump 89 and discharged via the delivery pipe 90 onto the evaporator coil 42. From there the evaporated VVC passes to the absorber coil 40, where it is absorbed back into the mixture and then follows the mixture path. A second scoop pump inlet 92 restricts the level of LVC in trough 86 by pumping excess LVC into a container 102 which is associated with the evaporator ON pump, and which has a bleed drain orifice 94 and an overflow 96.

The right hand end of the shaft 12 is divided into passageways 103, 105 for providing a flow path for coolant fluid, e.g. water, which passes down the centre of the shaft, circulates around the twin coils of the primary condenser 34 and then around the absorber coil 40 and then exits the shaft. The flow through the condenser coils 34 starts at the inner part of the left hand coil as viewed, travels spirally outwards, then back inwards and out. In the absorption coil 40, the flow starts at the outermost part of the coil and travels spirally inwards.

Likewise a chilled fluid water circuit (not shown) supplies and collects chilled water from the evaporator coils 42.

Having described the overall arrangement, certain particular improvements or modifications will now be described.

Control of Absorbent Mixture Flow Rate

The flow rate of the absorbent mixture around the heat pump is controlled by a flow restrictor 54 in the line between the second solution heat exchanger 38 and the absorber ON trough 56, associated with the vapour absorber 40.

The flow restrictor 54 may be an orifice, capillary, vortex or nozzle, and the flow rate through the restrictor 54 is determined by the pressure acting across it. Thus the flow rate depends on the relevant pressures rather than being set by the generator OFF pump capacity as previously. The flow rate will therefore be modulated by the pressure difference between the high and low pressure spaces 14, 18, and also the manometric head difference between the free surface in the feed chamber 28, and that in the absorber ON trough 56. The flow rate of absorbent will automatically increase as the pressure difference increases between spaces 14 and 18. The characteristics of the restrictor 54, the design pressure difference between spaces 14 and 18, and the disposition and capacity of the feed chamber 28 and the trough 56 are selected to provide the desired variation of flow rate with operating conditions.

The minimum flow rate at the target operating condition is normally set by crystallization considerations, but any margin above this reduces the efficiency of the heat pump due to increased losses in the solution heat exchangers. Thermodynamically the best efficiency will be obtained when the absorbent concentration is just sufficient to support the temperature lift demanded of the cycle. Under these circumstances various considerations will dictate the mass flow rate of absorbent required. In systems using water refrigerant and inorganic salt absorbent the minimum flow, at a given temperature lift, may be constrained by the maximum solution concentration that can be tolerated before the onset of crystallization.

FIG. 6 shows a typical idealised fluid characteristic where it can be seen that at an absorber and condenser temperature of 58° C., mixture at a given solution concentration can absorb refrigerant at 4° C. This solution concentration can be seen in the ideal cycle shown to produce a generator temperature of 200° C. When the absorber and the condenser temperatures are lowered to 35° C. then it can be seen if the solution concentration is lowered to suit the new conditions then the generator temperature drops to 117° C.

This means that for a given mass flow of absorbent around the cycle the heat losses through the heat exchangers would also be expected to drop. Additionally such a lower concentration would also substantially reduce the crystallization temperature permitting a lowering of the flow rate (and hence a higher solution concentration excursion). The control system described elsewhere in this application provides for both this automatic concentration adjustment and adjustment of the mass flow to further improve performance.

Fluid-Weighted Scoop Pumps

The common generator ON and OFF pump assembly 50 comprises a bob container 98 suspended from the shaft 12 by a journal bearing, and fed with liquid from the common trough 44 by an inlet pipe 100, which is radially inwards of inlet pipes 46 and 52. In operation this means that part of the fluid inventory normally held in the generator ON trough is held in the bob container, making a substantial contribution to the stationary mass of the pump assembly 50. Also, on shut down, a substantial amount of fluid would normally collect in the trough 44 and be displaced by the bob mass for the pump assembly. With the illustrated arrangement, when the pump is stationary, fluid remains in or passes into the bob container 98 via the inlet pipe 100, thus reducing the level of fluid in the trough and increasing the mass of the pump assembly. These features contribute to a greatly reduced drag on start up.

Likewise, the evaporator ON pump 89 comprises a bob container 102, which acts as a bob weight, and furthermore as a running buffer for refrigerant as to be discussed below.

Control of Absorbent Fluid Concentration

The arrangement of FIG. 2, is configured so that the concentration of absorbent is adjusted automatically in accordance with the rate of absorption of vaporised volatile component by the absorber 40. The evaporator ON pump 89 includes a pipe inlet 92 which pumps any excess liquid volatile component into the container 102. This LVC is removed from circulation and thus causes the proportion of absorbent in the circulating mixture to increase as the contents of container 102 increase. There is a controlled bleed via orifice 94 back into the trough 86. The maximum concentration of absorbent is limited by providing the container 102 with an overflow 96 which discharges into the absorber OFF trough 62. In this way, the absorbent concentration is self-regulating by storing a variable amount of LVC in the container 102, and the cycle requirements previously discussed may be met.

Scoop Pump Damping

Figure 3:
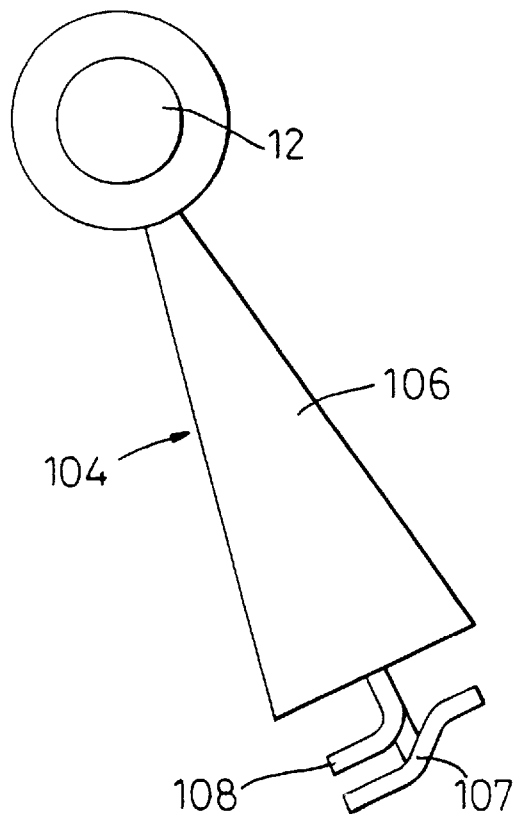
FIG. 3 is an example of damping device for use with a scoop pump in a modification of the heat pump shown in the Figures.

Referring to FIG. 3, there is shown a schematic form of a damping device for a scoop pump, which may be used for any or all of the scoop pumps in the arrangement of FIG. 2. The pump 104 is mounted by a journal on the shaft 12 and comprises a body 106 and a scoop pipe inlet 108. Below the scoop pump inlet 108 is provided a drag element, in the form of a dummy inlet 107. Here, even when the scoop pump inlet is clear of the fluid level, the dummy inlet 107 is still immersed and thus provides an important damping facility as the scoop pump inlet leaves or re-enters the fluid.

Figure 4:
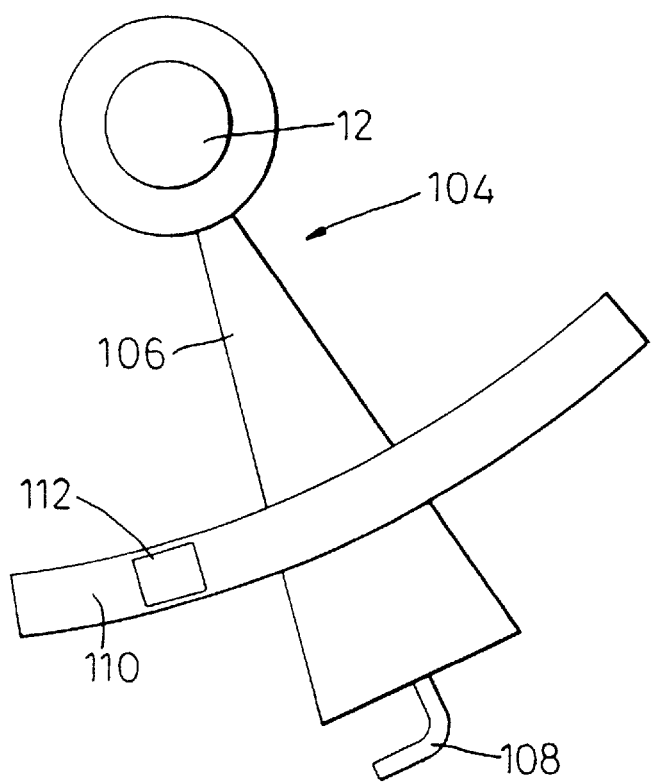
FIG. 4 is another example of damping device for use with a scoop pump.

In an alternative arrangement shown in FIG. 4, several parts are similar and are given like reference numerals. However, below the journal there is provided a curved track 110, which is not concentric with shaft 12, and which defines a constraining passage for a mass 112. The mass is constrained so that it may move along the track when the body is tilted about the shaft, tending to restore the body to its equilibrium state, but with some friction/stiction so that the kinetic energy of the pendulum movement is rapidly dissipated. The track many take may forms. This arrangement is particularly effective where there is no adjacent stationary structure to act as a reference.

Crystallization Prevention

As previously discussed it is desirable for cycle efficiency to operate as close to the crystallization limit as possible, but the effects of crystallization can be catastrophic. Accordingly, as can be seen in FIGS. 1 and 5, a flow diversion scheme is set up so that, as soon as the onset of crystallization is detected, mixture from the vapour generator 20 may be diverted at 112, upstream of the second solution heat exchanger 38, to join at 114 the flow from the vapour absorber 40 about to enter the second solution heat exchanger 38. This causes the temperature of the flow entering the second solution heat exchanger 38 from the vapour absorber 40 to increase, which increases the temperature of the flow from the second solution heat exchanger to the vapour absorber, past the region 116 where crystallization is most likely to start.

In the arrangement of FIG. 5, the flow diversion is controlled by a pressure sensitive weir 118. In normal operation the pressure difference between points 112 and 114 is insufficient to overcome the head defined by the weir and so there is no flow. However when crystallization begins in region 116, the back pressure at point 112 is sufficient to cause fluid to flow to point 114. In this arrangement, the flow restrictor 54 may advantageously be re-located upstream of the flow diversion point 112.

Various other flow control devices could be used and, for convenience FIG. 1 indicates the control means as a control valve 120. This feature may also be used to deal with working fluids prone to undesirable increases in viscosity tending to obstruct flow.

Common On/Off Generator Trough

It will be noted that the various scoop pipe inlets 46, 52 and 100 take fluid from the same trough 44, but that the generator ON inlet pipe 46 is deeper in the trough than the other two. This ensures that at start up and other extreme conditions, the generator ON pump has preferential access to fluid in the trough, thus reducing the possibility of the generator surface running dry.

Heat Exchangers

In the arrangement of FIG. 1, to provide enhanced heat and mass transfer, the heat exchangers making up the condenser 34, the absorber 40 and the evaporator 42, comprise spirals of metal tubing (typically copper) of flattened cross-section. The spirals are generally closed with adjacent turns touching or close to each other. We have found that the corrugated surface defined by the, tubing provides increased surface area and an excellent surface for heat and mass transfer.

Hydrogen Contamination

In the illustrated embodiments, at least one of the sealed spaces 14, 16, 18 contains an element 114 of hydrogenatable polymer material which is loaded with a catalyst and which has a high affinity for hydrogen molecules, and which in use scours the internal atmosphere of hydrogen to avoid contamination of the absorbent fluid on the absorber.

A typical combination of polymer and catalyst is a styrene-butadiene triblock copolymer PS-PB-PS such as Kraton D1102 from Shell Chemical Company and an Iridium based catalyst such as the Crabtree Catalyst [Ir(COD)(py) (tcyp)]$PF_6$ (COD—1.5-cyclooctadiene; py-pyridene, tcyp—tricyclohexylphosphine). An element of such material of volume 300 ml may be sufficient to absorb free hydrogen for a period of several years.

Pressure Relief

The arrangement of FIG. 2 also includes pressure relief valves 122, 124 between the high and intermediate, and intermediate and low pressure spaces 14 and 16, and 16 and 18 respectively. The pressure relief valves provide a smooth modulation of flow rate with pressure when they open, thus allowing the heat pump to have an extended operating range, operating as a single stage heat pump when the pressure differential across the pressure relief valves exceeds the valve opening pressure, and returning to two stage operation when the pressure difference returns to normal.

We claim:

1. An absorption cycle heat pump said heat pump comprising a rotary assembly including a vapor generator, a condenser, an evaporator and an absorber so interconnected as to provide cyclic fluid flow paths for a working fluid comprising a refrigerant and an absorbent, and having at least one site prone to at least one of crystallisation and high viscosity, including means responsive to an increase in local pressure indicative of at least one of the onset of crystallisation of absorbent in the working fluid and the onset of high viscosity, to initiate means to effect at least one of:

(i) preventing further crystallization;

(ii) re-dissolving at least part of said crystallized material, and (iii) reducing said viscosity.

2. An absorption cycle heat pump according to claim 1, which comprises clearance means for increasing the temperature and/or reducing the concentration of absorbent in the working fluid at or adjacent a site prone to crystallization or increased viscosity.

3. An absorption cycle heat pump according to claim 2, including means for diverting a stream of fluid at least temporarily to increase the temperature of the flow past said site.

4. An absorption cycle heat pump according to claim 1, wherein, in use, absorbent fluid passing from the vapor generator to the absorber gives up heat to absorbent fluid passing in the opposite direction via a solution heat exchanger, and said heat pump includes means for diverting a portion of the absorbent fluid from the path from the generator to the absorber to be introduced into the return flow from the absorber back to the vapor generator, thereby increasing temperature of the flow upstream of the site prone to crystallization or increased viscosity.

5. An absorption cycle heat pump according to claim 1, wherein said diversion means is operable to divert coolant fluid from the condenser to the evaporator, thereby to raise the evaporation temperature and cause an increased amount of refrigerant to evaporate and be taken up by the absorbent, resulting in a temporary decrease in concentration of absorbent in the working fluid and an increase in temperature of the working fluid in the crystallization region.

6. A method of operating an absorption cycle heat pump, comprising a rotary assembly including a vapor generator, a condenser, an evaporator and an absorber so interconnected as to provide cyclic fluid flow paths for a working fluid comprising a refrigerant and an absorbent, and having at least one site prone to at least one of crystallization and high viscosity, which method comprises monitoring the working fluid to detect an increase in local pressure, indicative of at least one of the onset of crystallization of absorbent in the working fluid or the onset of high viscosity and, on detecting such an increase, initiating preventive measures for effecting at least one of preventing further crystallization and re-dissolving crystallized material, and reducing said viscosity.

7. An absorption cycle heat pump comprising a rotary assembly including a vapor generator, a condenser, an evaporator and an absorber so interconnected as to provide cyclic fluid flow paths for a volatile fluid component and an absorbent fluid therefor, and flow rate control means for controlling the flow rate of said absorbent fluid in accordance with at least one of:

(i) the temperature difference between the absorber and the evaporator, (ii) the thermal load on the heat pump, and (iii) one or more other operating parameters.

8. A method of operating an absorption cycle heat pump comprising a rotary assembly including a vapor generator, a condenser, an evaporator and an absorber so interconnected as to provide cyclic fluid flow paths for a volatile fluid component and an absorbent fluid therefor, which comprises controlling the flow rate in accordance with at least one of:

(i) the temperature difference between the absorber and the evaporator, (ii) the thermal load on the heat pump, and (iii) one or more other operating parameters.

9. An absorption cycle heat pump comprising a rotary assembly including a vapor generator, a condenser, an evaporator and an absorber so interconnected as to provide cyclic fluid flow paths for a working fluid comprising an absorbent and a volatile component, therefore, said heat pump including means for adjusting the concentration of said absorbent in said working fluid in accordance with at least one of:

(i) the temperature difference between the absorber and the evaporator, (ii) the thermal load on the heat pump, and (iii) one or more other operating parameters.

10. An absorption cycle heat pump according to claim 4, wherein said flow diversion means includes pressure sensitive means disposed in a diversion flow path connecting said two flows and adapted to open to allow flow from the flow path between the vapor generator and the absorber back to pass into the return flow from the absorber to the vapor generator at a location downstream of the absorber, when the pressure exceeds a pre-set limit.

11. An absorption cycle heat pump according to claim 10, wherein said pressure sensitive means comprises a valve.

12. An absorption cycle heat pump according to claim 10, wherein said pressure sensitive means comprises a weir arrangement including a flow section defining a fluid head arranged to prevent flow along said diversion flow path when the pressure is below said preset limit.

* * * * *